(12) United States Patent
Bowman et al.

(10) Patent No.: US 7,640,823 B2
(45) Date of Patent: Jan. 5, 2010

(54) INTEGRATED AUTOMATIC MANUAL TRANSMISSION LEVER-TYPE SHIFT SELECTOR

(75) Inventors: Darrell S. Bowman, Blacksburg, VA (US); H. Lenora Hardee, Fort Wayne, IN (US); Joseph T. Penaloza, Fort Wayne, IN (US); Mary Mc. Wesler, New Paris, OH (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 282 days.

(21) Appl. No.: 11/742,166

(22) Filed: Apr. 30, 2007

(65) Prior Publication Data
US 2008/0264194 A1    Oct. 30, 2008

(51) Int. Cl.
F16H 59/04 (2006.01)
G05G 5/08 (2006.01)
G05G 9/047 (2006.01)

(52) U.S. Cl. .............. 74/473.33; 74/473.25; 74/473.3; 74/471 XY

(58) Field of Classification Search ............... 74/473.1, 74/473.12, 473.18, 473.21, 473.24, 473.25, 74/473.3, 473.33, 471 XY
See application file for complete search history.

(56) References Cited

U.S. PATENT DOCUMENTS

| | | | |
|---|---|---|---|
| 1,630,076 A * | 5/1927 | Schmidt | 74/473.3 |
| 1,653,072 A * | 12/1927 | Trunck | 74/473.3 |
| 1,690,180 A * | 11/1928 | Schmidt | 74/473.15 |
| 4,073,199 A * | 2/1978 | Simons | 74/473.3 |
| 4,732,232 A * | 3/1988 | Miyagi et al. | 180/336 |
| 5,791,197 A | 8/1998 | Rempinski et al. | |
| 5,845,534 A * | 12/1998 | Kim | 74/473.12 |
| 5,899,115 A * | 5/1999 | Kataumi et al. | 74/473.18 |
| 5,913,935 A * | 6/1999 | Anderson et al. | 74/335 |
| 6,029,535 A * | 2/2000 | Kenny et al. | 74/473.3 |
| 6,173,622 B1 | 1/2001 | Carnevale et al. | |

* cited by examiner

Primary Examiner—Thomas R Hannon
Assistant Examiner—Justin Krause
(74) Attorney, Agent, or Firm—Jeffrey P. Calfa; Mark C. Bach

(57) ABSTRACT

A bimodal shifter assembly provides a radically simplified mechanical arrangement for movement of the shifter in each of two modes along distinct shift paths.

4 Claims, 5 Drawing Sheets

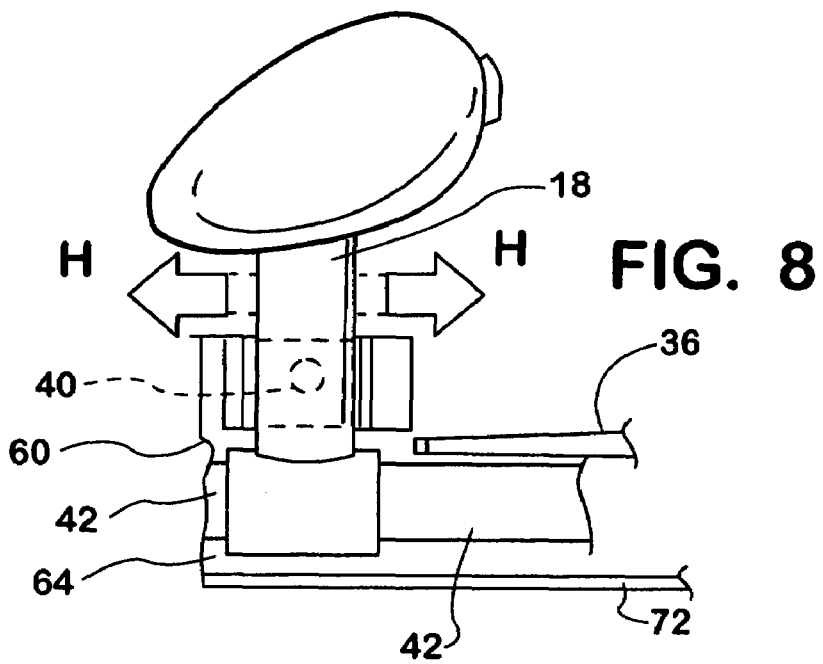
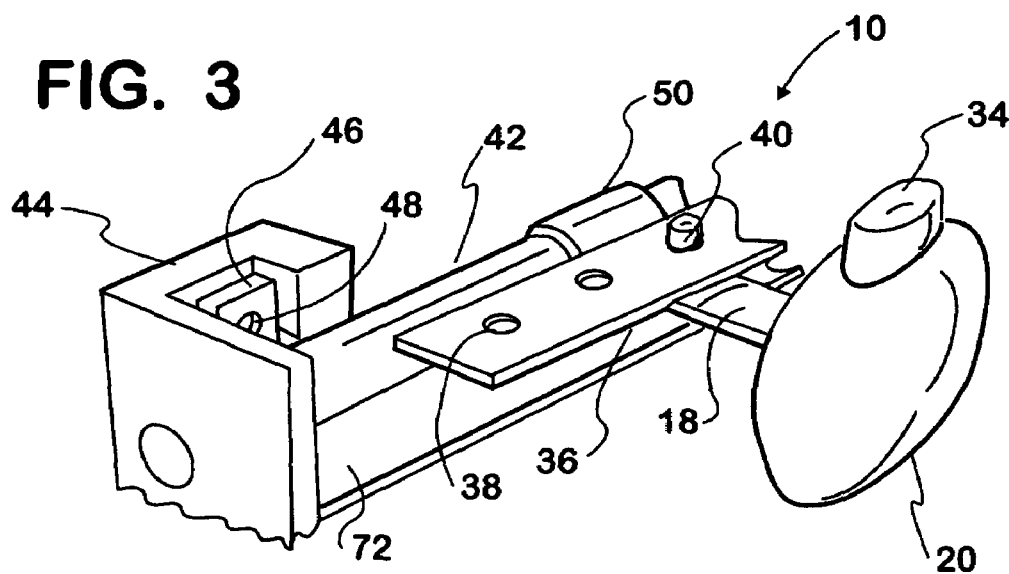
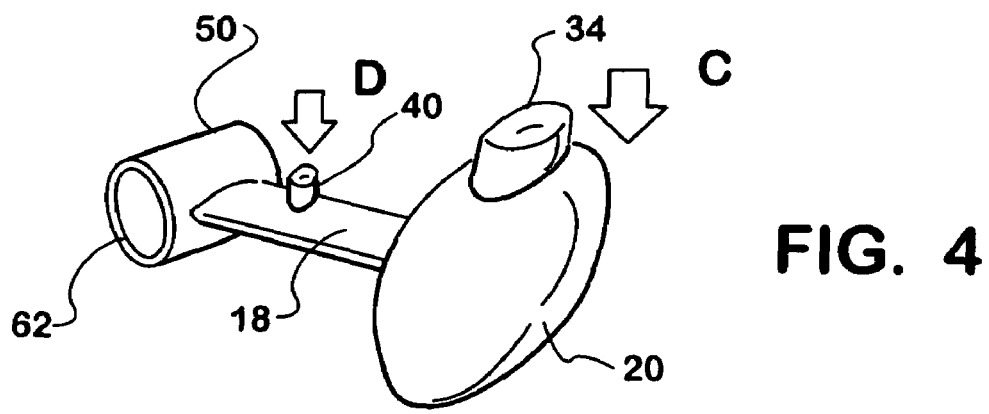

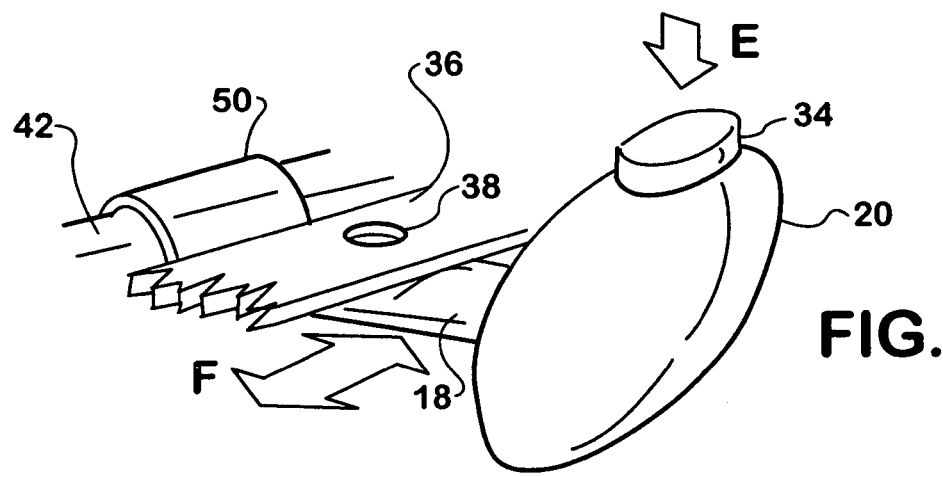
FIG. 5
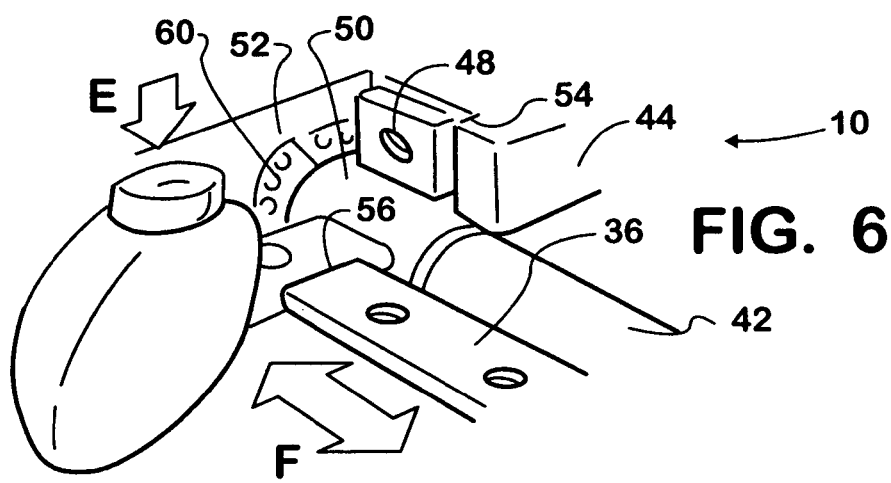
FIG. 6
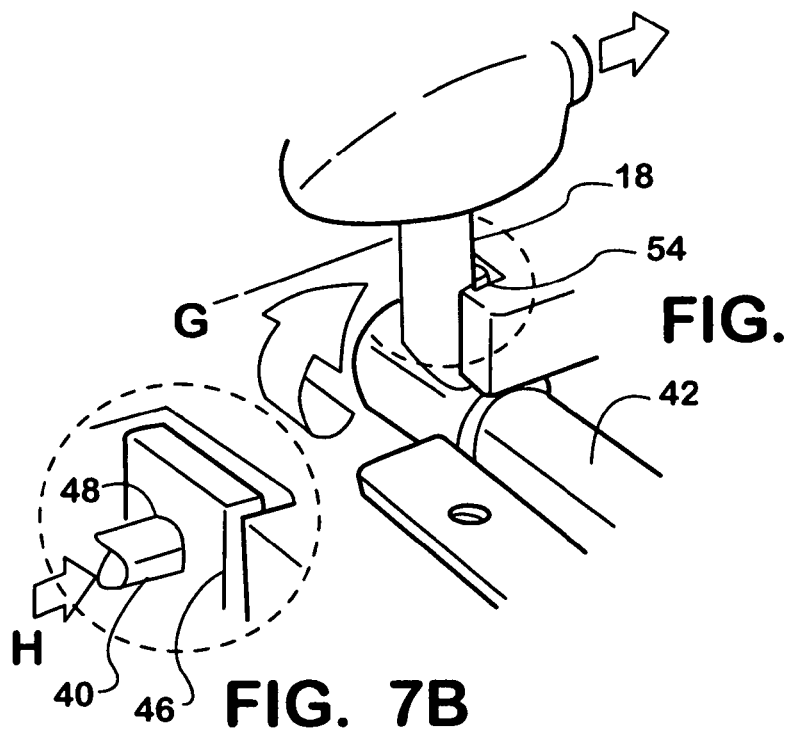
FIG. 7A
FIG. 7B

INTEGRATED AUTOMATIC MANUAL TRANSMISSION LEVER-TYPE SHIFT SELECTOR

BACKGROUND OF THE INVENTION

1. Technical Field

The present invention relates to a shifter assembly for automatic transmissions, and more specifically, to a shifter assembly having an automatic and a manual shift path.

2. Description of the Problem

Multi-mode shifter assemblies are used with automatic transmissions and provide a normal automatic mode and a manual mode in which the automatic transmission may be shifted in a manner akin to a manual transmission. To switch from automatic to manual mode, a shift lever is moved from an automatic shift path to a parallel manual shift path where the driver may then shift from gear to gear manually. The manual shift path of such systems has differed somewhat from the convention "H" pattern of true manual transmissions. The manual shift path is a fore to aft oriented straight line. The shifter is spring loaded to return to a center position along the path. The shifter is moved forward or backward to change gears and parallels the shift path of the shift lever in automatic mode. A transverse path conventionally connects the two paths, which have been located in the same plane.

An example of a multi-mode shifter is disclosed in U.S. Pat. No. 5,791,197 to Rempinski et al. issued Aug. 11, 1998. The transmission control arm in the Rempinski patent is pivotally connected to the base for movement about an axis for connection to a linkage for operating the automatic transmission. The shift lever is supported on the base independently of the control arm. More specifically, a ball and socket joint supports the shift lever on the base for pivotal movement relative to the control aim for changing between shift paths. The Rempinski patent identified several considerations to take into account in providing these shift mechanisms. Among the criteria taken into consideration was the need to provide an easy and smooth re-entry into the automatic mode from the manual mode. Here it should be observed that ergonomic considerations, and a clear indication to the driver as to which mode the vehicle is in, are important.

There is always a need to simplify the assembly by reducing the number of components. Many prior art systems have strived, at the cost of some complexity, to allow the shift arm to pivot even when displaced to a parallel path.

SUMMARY OF THE INVENTION

According to the invention there is provided a transmission shifter assembly based on a shaft, a shift lever mounted on the shaft for movement along the shaft and rotation on the shaft, and a guide plate located parallel to the shaft for a portion of the length of the shaft thereby defining a first movement path for the shift lever parallel to the shaft by limiting rotation of the shift lever. The shaft extends past an end of the guide plate allowing the shift lever to be moved along the shaft past the end of the guide plate for rotation on the shaft. A latching element is positioned relative to the shaft to engage the shift lever on rotation on the shaft out of the first movement path. The latching element restrains the shift lever on engagement from further rotation and to movement in a second movement path parallel to the shaft.

A plurality of detents is provided in the guide plate which correspond to settings of an automatic transmission. A spring loaded pin in the shift lever provides for engaging the pin to the detents and the latching element. A release button disengages the spring loaded pin from the detents and the latching element.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a perspective view of the shifter assembly of the invention;

FIG. 4 is a perspective view of a shift lever for the shifter assembly of FIG. 3.

FIG. 5 is a partial perspective view of the shifter assembly illustrating manipulation of the assembly in automatic mode operation;

FIG. 6 is a partial perspective view of the shifter assembly with the shift lever positioned for transition to manual mode operation;

FIG. 7A is a partial perspective view of the shifter assembly with the shift lever positioned for manual mode operation;

FIG. 7B is an expanded view of a locking plate for manual mode operation;

FIG. 8 is a side elevation of the shifter assembly;

DETAILED DESCRIPTION OF THE INVENTION

Figure 1:
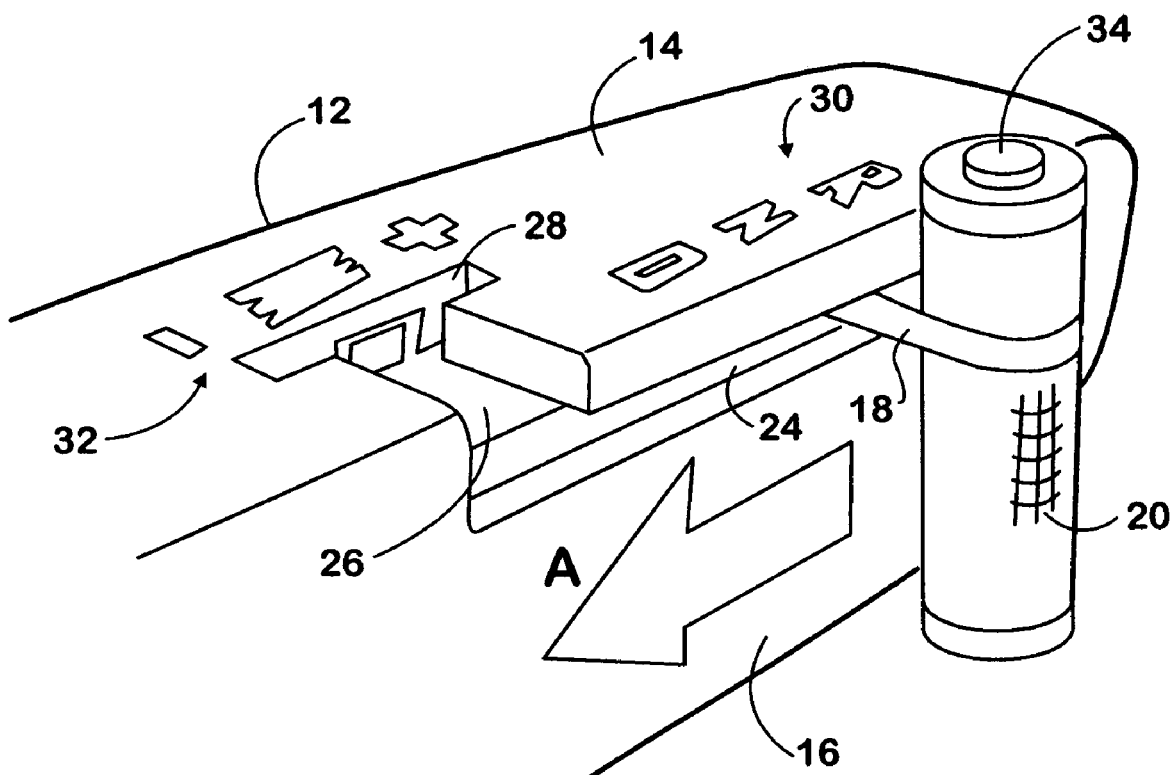
FIG. 1 is a perspective view of the external housing for a shifter assembly with a shift lever placed for automatic mode operation of a vehicle automatic transmission.
Figure 2:
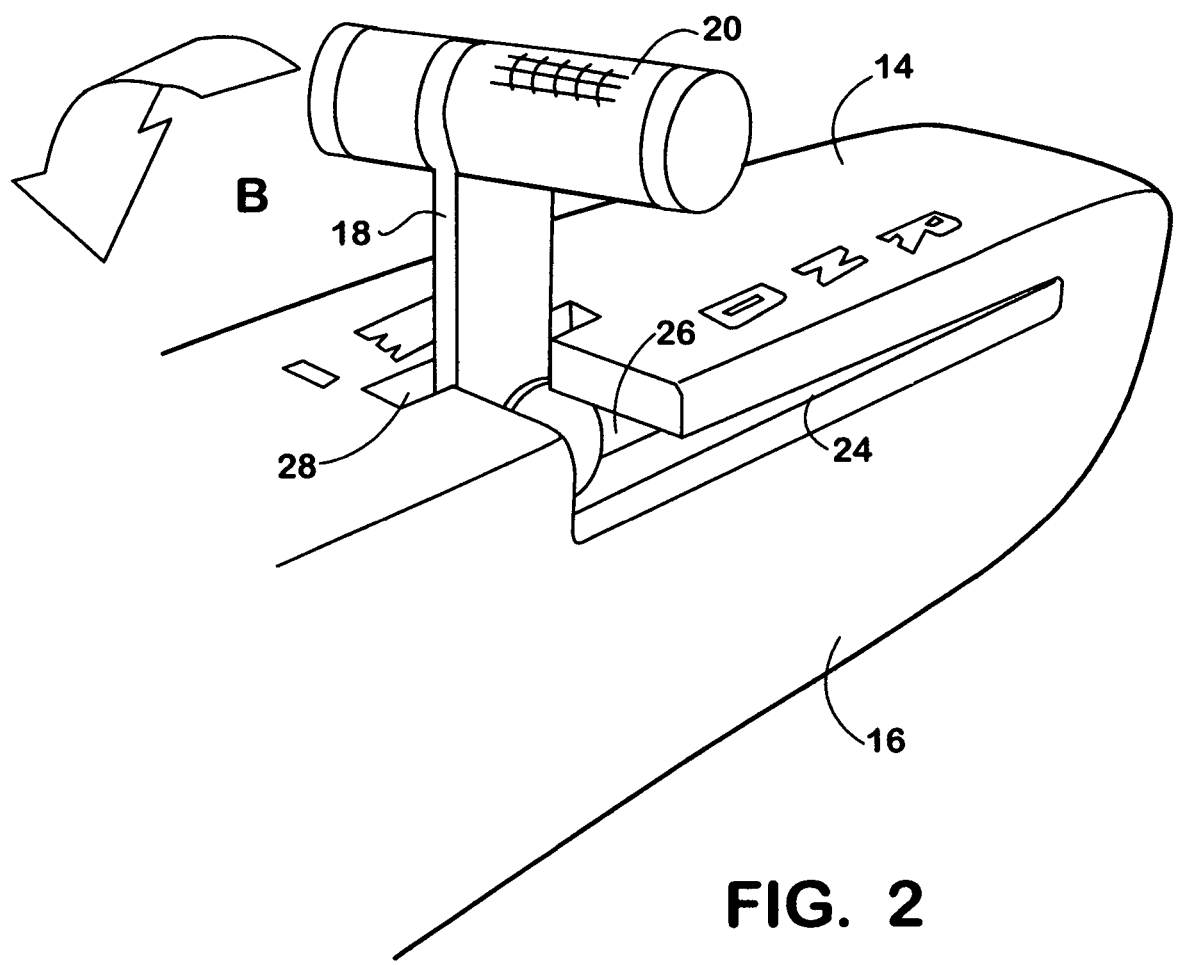
FIG. 2 is a perspective view of the housing of FIG. 1 with the shift lever moved for operation of the automatic transmission in manual mode.

Referring now to the figures and in particular to FIGS. 1 and 2, a housing 12 suitable for positioning inside the cab of a motor vehicle to enclose a shifter assembly 10 (shown to advantage in FIGS. 3 and 6) for a motor vehicle is illustrated. Housing 12 is constructed in part from two orthogonal sides 14 and 16 for location in the cab of a vehicle for operation by a driver. A shift lever 18 extends from inside housing 12 through slot 24 in side 16 of the housing, terminating in a handle 20. Handle 20 may be grasped by a vehicle operator to move shift lever 18 fore and aft (as indicated by letter A) in slot 24 to change gears of an automatic transmission (indicated by markings 30). Slot 24 is connected to an abbreviated fore to aft manual mode slot 28 through an upper surface 14 of housing 12 by a transitional slot 26. Transitional slot 26 passes from the exterior to the interior of housing 12 through surfaces 14 and 16 and the right angle intersection of the two surfaces allowing shift lever 18 to be moved from slot 24 to slot 28.

To move shift lever 18 from automatic mode slot 24 to manual mode slot 28 the shift lever is moved, after depression of a release button 34 located on handle 20 in direction 1 to a full aft position in slot 24, than rotated in the direction B (counterclockwise into the page) through transitional slot 26 to manual mode slot 28. In manual mode slot 28 the shift lever 18 may be rocked back and forth to shift from the current gear to a gear one step higher (the "+" direction) or one step lower (the "−" direction) as indicated by markings 32. To return to automatic mode the shift lever 18 is rotated in the opposite direction upon depression of the release button 34. The full right angle rotation of shift lever 18 makes clear which operational mode of the transmission has been selected. Shift lever 18 is spring loaded to bias the shift lever to a center position between "+" and "−" in the manual mode slot 24.

The mechanism of the present invention is intended to work with suitable sensors which are responsive to positioning of the shift lever 18 to generate signals for application to a transmission controller (not shown). Since the current invention concerns positioning of the shift lever 18 and not the operation of the sensors, they are not shown for the sake of simplicity in description.

Referring to FIGS. 3-6 and 7A-B, the shifter assembly 10 of the invention is shown. Shifter assembly 10 supports shift lever 18 for linear movement along each of two parallel paths. The parallel paths are defined in mutually orthogonal (or more broadly, intersecting, but non-coincident planes). Through use of a rotatable shaft 42 on which the shift lever 18 is mounted it is possible to rotate the shift lever between the paths in the mutually orthogonal planes. Linear shaft 42 is mounted for rotation on housing 12 (not shown), and typically mounted in line with the direction of travel, though this is not required. Alternatively, shift lever 18 is mounted by a handle collar 50 to shaft 42 allowing shift lever 18 to be moved axially along shaft 42 and rotated on shaft 42. The rotation of shift lever 18 is constrained however by suitable means, preferably by upper and lower guide plates 36 and 72, respectively, which parallel shaft 42 and face one another to define an elongated slot adjacent the shaft in which the shifter arm 18 can be moved. The travel of shift lever 18 is limited fore and aft by suitable stops including a stop 52 at the rearmost portion of the shaft which also acts to align shift lever 18 with transitional slot 26.

While lower guide plate 72 extends the full length of the limits of travel of shift lever 18 on shaft 42, the upper guide plate 36 terminates in an end 56 short of the stop 52. This is done to allow the shift lever 18 to rotate on shaft 42 from a position in the plane of the slot defined between the guide plates into engagement with a manual drive section 44.

Upper guide plate 36 also includes a series of detents 38 which provide motion locking points for shift lever 18 corresponding to gear selection positions for the automatic transmission. A spring loaded locking pin 40 extends from shift lever 18 into engagement with a detent 38 or 48 to fix the location of the shift lever 18. Pin 40 is rounded or beveled at its entry end to insure it is guided into holes 38 or 48 without absolutely precise alignment and still obtain a snug fit between the pin and the hole to avoid slipping after insertion. Spring loaded locking pin 40 may be withdrawn (moved in direction "D") from any detent 38, 48 by depression of release button 34 (indicated by arrow "C"). The shift lever 18 may be moved back and forth in directions "F" by holding the release button in position "E".

Shift lever 18 is held in manual drive section 44 by a locking plate 46 set in an indentation/slot 54 in the manual drive section 44. Indentation/slot 54 is close to the longitudinal axis of shaft 42, which keeps shift lever 18 vertical. Centered in locking plate 46 is a locking plate indent 48 into which pin 40 fits to retain the shift lever 18 against rotation. Shift lever 18 has a limited degree of fore to aft translation room when locked with locking plate 40. One way to achieve this is to provide the locking plate 40 itself with a limited degree of freedom of movement fore to aft. It is also useful to assure that shift lever 18 is not bumping up against stop 52 after rotation of the lever into engagement with locking plate 46. To achieve limited freedom of movement aft after rotation of shift lever 18 into engagement with locking plate 46, an edge of collar 50 may include a sloped cam follower section 62 which abuts a cam 60 built into stop 52. Upon rotation in direction "G" shift lever 18 is urged slightly forward from its full back position against stop 52 until the cam 60 and cam follower 62 clear one another as the pin 40 engages the locking plate 46. The depth of pin 40's penetration into indent 48 keeps shift lever 18 from rotating, that is, locked in place.

Figure 9:
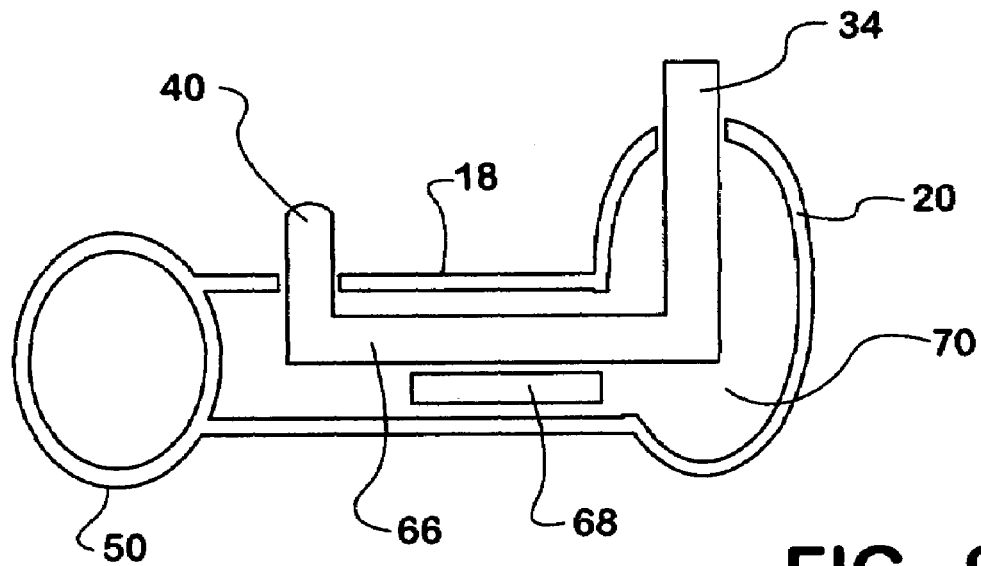
FIG. 9 is a cross sectional view of shift lever.
Figure 10:
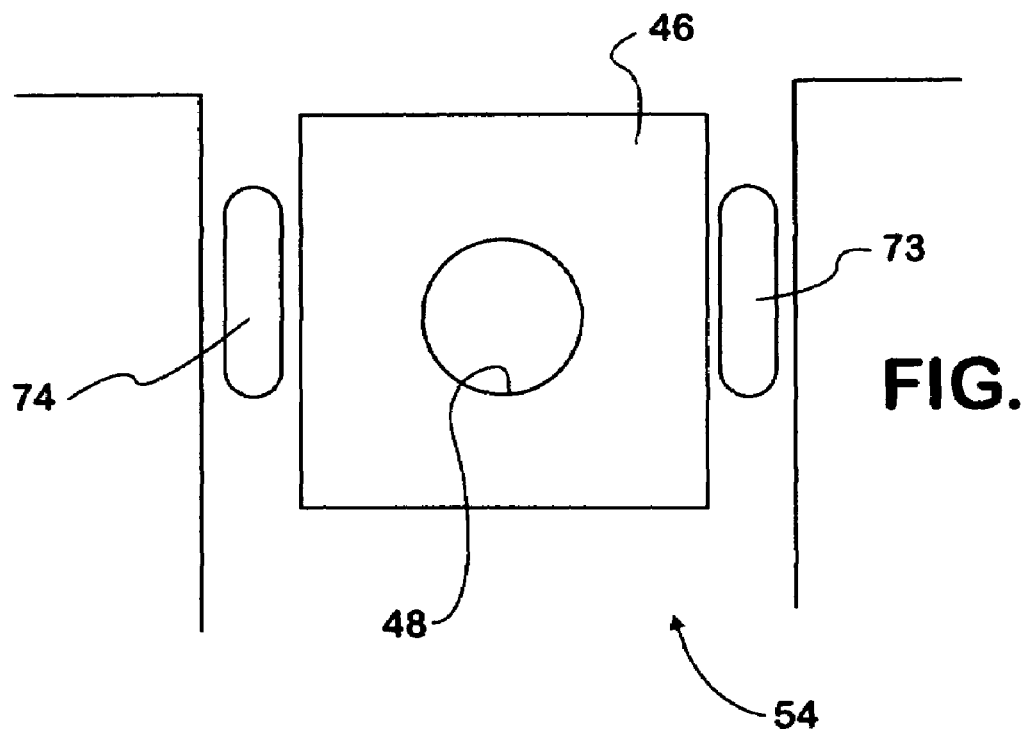
FIG. 10 is an elevation of the locking plate for the manual mode section of the shifter assembly.

FIG. 9 is a cross-sectional view of shift lever 18 in which it may be seen that pin 40 and release button 34 are part of a continuous "C" shaped element 66 which is biased upwardly by a compression spring 68. In FIG. 10 a locking plate 46 is biased to a middle position in slot/indent 54 by compression springs 73, 74 along opposed sides of the locking plate 46. The springs tend to center the locking plate 46 and the shift lever 18 should it be engaged thereon. Shifter knob 20 is placed a sufficient distance from side 16 so as to facilitate an easy grasp and ergonomic finger clearance. Knob 20's proximity to label 30 on surface 14 provides a visual indication of the transmission gear selected when the system is in automatic mode.

A bimodal shifter assembly provides a radically simplified mechanical arrangement for movement of the shifter in each of two modes along distinct shift paths.

While the invention is shown in only two of its forms, it is not thus limited but is susceptible to various changes and modifications without departing from the spirit and scope of the invention.

What is claimed is:

1. A transmission shifter assembly comprising:
   a housing:
   a shaft mounted spaced with respect to the housing
   a first transmission mode slot through the housing parallel to the shaft;
   a second transmission mode slot through the housing parallel to the shaft;
   a transitional slot connecting the first and second transmission mode slots;
   a shift lever mounted on the shaft and extending outwardly from the shaft through a selected one of the slots through the housing for manipulation by an operator, the shift lever being positionable parallel to the shaft in either the first or second transmission mode slots by the operator for transmission gear selection, and the shift lever being rotatable for movement of the shift lever in the transitional slot between the first and second transmission mode slots.

2. A transmission shifter assembly as set forth in claim 1, further comprising:
   a guide plate positioned parallel to the shaft in a fixed positional arrangement, the guide plate having a plurality of detents corresponding to automatic transmission operational settings for engagement by the shift lever when the shift lever is moved in the first transmission mode slot.

3. A transmission shifter assembly as set forth in claim 2, further comprising:
   a lock plate located to engage the shift lever when rotated into the second transmission mode slot.

4. A transmission shifter assembly as set forth in claim 3, further comprising:
   a spring loaded engagement pin located in the shift lever for engaging the detents and the locking plate.

* * * * *